(12) United States Patent
Zievers

(10) Patent No.: US 9,055,070 B2
(45) Date of Patent: *Jun. 9, 2015

(54) HARDWARE COMPUTING SYSTEM WITH EXTENDED CALCULATION AND METHOD OF OPERATION THEREOF

(71) Applicant: Xcelemor, Inc., Danville, CA (US)

(72) Inventor: Peter J. Zievers, Naperville, IL (US)

(73) Assignee: Xcelemor, Inc., Livermore, CA (US)

( * ) Notice: Subject to any disclaimer, the term of this patent is extended or adjusted under 35 U.S.C. 154(b) by 167 days.

This patent is subject to a terminal disclaimer.

(21) Appl. No.: 13/789,649

(22) Filed: Mar. 7, 2013

(65) Prior Publication Data

US 2013/0191854 A1 Jul. 25, 2013

Related U.S. Application Data

(60) Provisional application No. 61/612,882, filed on Mar. 19, 2012.

(51) Int. Cl.
| | | |
|---|---|---|
| *G06F 3/00* | (2006.01) | |
| *G06F 9/44* | (2006.01) | |
| *G06F 9/46* | (2006.01) | |
| *G06F 13/00* | (2006.01) | |
| *G05B 13/00* | (2006.01) | |
| *G06F 17/00* | (2006.01) | |
| *H04L 29/08* | (2006.01) | |
| *G06F 9/54* | (2006.01) | |

(52) U.S. Cl.
CPC *H04L 67/10* (2013.01); *G06F 9/46* (2013.01); *G06F 9/54* (2013.01); *G06F 9/545* (2013.01)

(58) Field of Classification Search
None
See application file for complete search history.

(56) References Cited

U.S. PATENT DOCUMENTS

| | | | |
|---|---|---|---|
| 5,847,578 A | * | 12/1998 | Noakes et al. ............... 326/39 |
| 6,628,653 B1 | * | 9/2003 | Salim ......................... 370/389 |
| 7,823,131 B2 | | 10/2010 | Gard et al. |
| 7,991,909 B1 | * | 8/2011 | Schumacher et al. ........ 709/237 |
| 8,059,670 B2 | | 11/2011 | Soni et al. |
| 8,127,113 B1 | | 2/2012 | Sinha et al. |
| 2006/0259747 A1 | | 11/2006 | Gonzalez et al. |
| 2011/0231644 A1 | | 9/2011 | Ishebabi |
| 2012/0266171 A1 | | 10/2012 | Byun et al. |
| 2012/0266179 A1 | | 10/2012 | Osborn et al. |
| 2013/0179486 A1 | * | 7/2013 | Lee et al. ..................... 709/201 |

OTHER PUBLICATIONS

International Search Report for PCT Application No. PCT/US2013/032867 dated Jun. 10, 2013

* cited by examiner

*Primary Examiner* — Craig Dorais
(74) *Attorney, Agent, or Firm* — Ishimaru & Associates LLP

(57) ABSTRACT

A method of operation of a hardware computing system includes: receiving a command stream from a general purpose central processing unit; transferring a command from the command stream by an application manager; activating a programmable execution array, by the application manager, for processing the command; and providing a response through a result stateful multiplexer to the general purpose central processing unit for the command from the command stream.

18 Claims, 8 Drawing Sheets

HARDWARE COMPUTING SYSTEM WITH EXTENDED CALCULATION AND METHOD OF OPERATION THEREOF

CROSS-REFERENCE TO RELATED APPLICATION(S)

This application claims the benefit of U.S. Provisional Patent Application Ser. No. 61/612,882 filed Mar. 19, 2012, and the subject matter thereof is incorporated herein by reference in its entirety.

TECHNICAL FIELD

The present invention relates generally to a hardware computing system, and more particularly to a system for accelerating application execution.

BACKGROUND ART

Operating systems in computers enable the computers to communicate with external resources for execution of commands related to an application. The operating system typically handles direct control of items associated with computer usage including keyboard, display, disk storage, network facilities, printers, modems, etc. The operating system in a computer is typically designed to cause a general purpose central processing unit ("CPU") to perform tasks including the managing of local and network file systems, memory, peripheral device drivers, and processes including application processes.

Placing responsibility for all of these functions on the CPU imposes significant processing burdens on it, particularly when the operating system is sophisticated, as, for example, in the case of Windows NT™, Unix™, and NetWare™. The CPU is called upon to perform housekeeping tasks for the system and installed software. The continuous update of software and the maintenance tasks of the compute hardware can relegate the execution of an application to a very low priority. The more burden that is placed on the CPU to run tasks other than those associated with applications, the less CPU time is available to run applications with the result that performance of the applications may be degraded.

In addition, the throughput of devices external to the CPU is subject to the limitations imposed by the CPU when the operating system places responsibility for managing these devices on the CPU. Furthermore, reliability of the overall software-hardware system, including the CPU, running the operating system, in association with the devices, will depend, among other things, on the operating system. Owing to the inherent complexity of the operating system, unforeseen conditions may arise which may undermine stability of the overall software-hardware system.

Thus, a need still remains for a hardware computing system with extended calculation. In view of the performance and power limitations imposed on general purpose central processing units, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a hardware computing system including: receiving a command stream from a general purpose central processing unit; transferring a command from the command stream by an application manager; activating a programmable execution array, by the application manager, for processing the command; and providing a response through a result stateful multiplexer to the general purpose central processing unit for the command from the command stream.

The present invention provides a hardware computing system including: a general purpose central processing unit for transferring a command stream; an application manager coupled to the general purpose central processing unit for receiving a command from the command stream; a programmable execution array coupled to the application manager for processing the command; and a result stateful multiplexer coupled between the general purpose central processing unit and the programmable execution array includes the command executed by the programmable execution array and a response transferred to the general purpose central processing unit.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
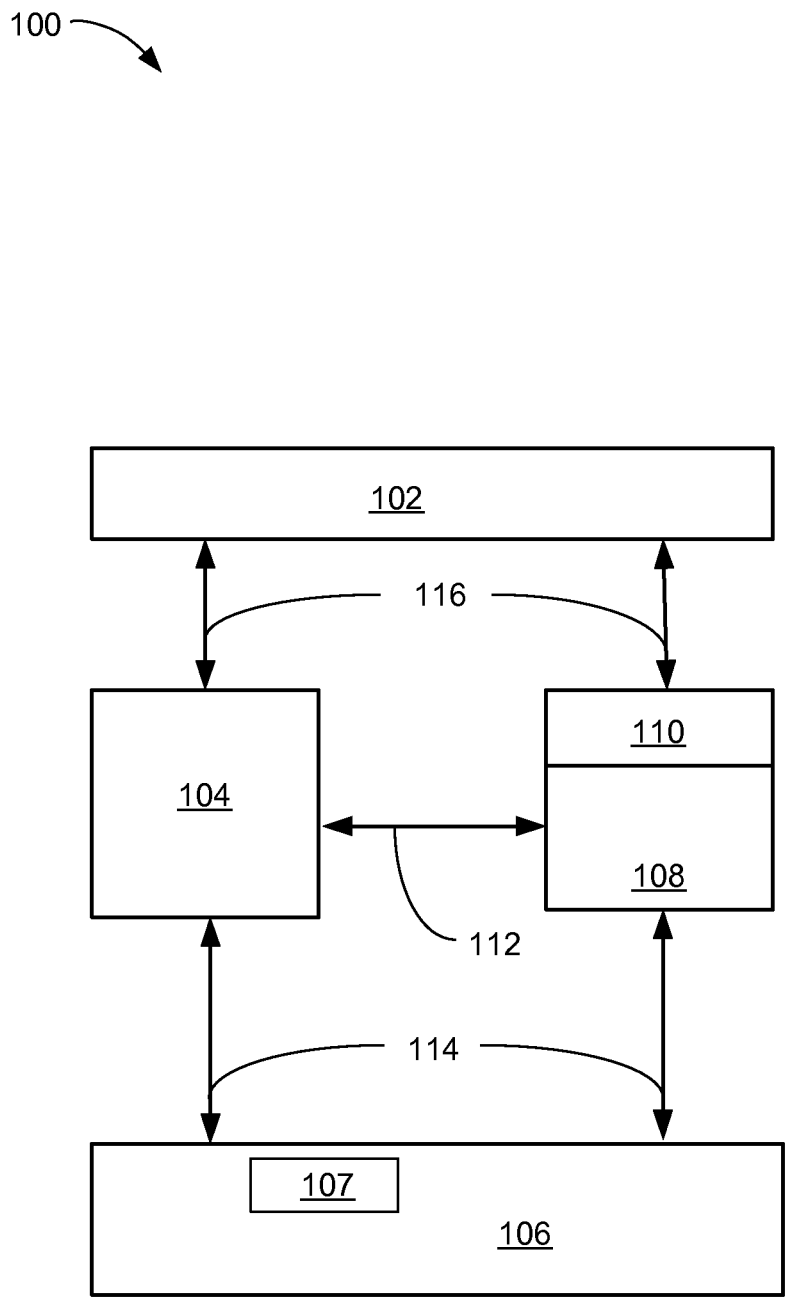
FIG. 1 is a block diagram of a hardware computing system in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention.

However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

The same numbers are used in all the drawing FIGs. to relate to the same elements. The embodiments have been numbered first embodiment, second embodiment, etc. as a matter of descriptive convenience and are not intended to have any other significance or provide limitations for the present invention.

The term "application" refers herein to a sequence of software commands grouped in order to complete a desired process. The term "processing" as used herein includes decoding of software commands, loading of registers, accessing peripherals, and/or accessing memory in executing an application.

The term "software application" refers herein to a machine language program, compiled to operate in the general purpose central processing unit, comprising a list of executable commands that are recognized by the general purpose central processing unit.

The term "execute" refers herein to perform a mathematical operation, a logical operation, storage access operation, or a combination thereof, as required by a command of the software application.

Referring now to FIG. 1, therein is shown a block diagram of a hardware computing system 100 in an embodiment of the present invention. The block diagram of a hardware computing system 100 depicts a peripheral controller 102, can be an integrated circuit for communicating with peripheral devices such as disk drives, tape drives, communication devices, printers, scanners, or the like, coupled to a general purpose central processing unit 104. The term "general purpose central processing unit" refers herein to any micro-processor or processor group that is intended to execute software instructions for operation of a software application. A memory device 106 can be coupled to the general purpose central processing unit 104 for storing operation results and retrieving instructions or operation input data required by a software application 107. The memory device 106 can include registers, dynamic random access memory (DRAM), static random access memory (SRAM), non-volatile random access memory (NVRAM), or the like. It is understood that the software application 107 can enter the hardware computing system 100 from the memory device 106 or the peripheral controller 102. It is also understood that the software application 107 can be transferred from the peripheral controller 102 to the memory device 106 at an initiation of the software application 107.

An application manager 108 can be coupled to each of the peripheral controller 102, the general purpose central processing unit 104, and the memory device 106. The application manager 108 can configure a programmable execution array 110 in order to select which of the configured commands can be executed by the programmable execution array 110. The application manager 108 can maintain a command configuration table that can be used to supplement or replace commands configured in the programmable execution array 110. The programmable execution array 110 can include a plurality of field programmable gate arrays and supporting memory that are capable of being configured to support the software application 107.

It is understood that any application commands or command strings for the programmable execution array 110 can be configured by a system developer (not shown) to include an array of commands that can be executed in the programmable execution array 110 rather than by the software application 107. The programmable execution array 110 can execute the commands for the software application 107 one to two orders of magnitude faster than is possible with the general purpose central processing unit 104. The performance benefit provided by the application manager 108 can be customized to support specific commands or applications in order to provide the optimum performance benefit when the application manager 108 is invoked.

The application manager 108 can receive a command call from the software application 107 and activate the programmable execution array 110 when the programmable execution array 110 is configured to support the current command call. The application manager 108 maintains a list of commands that can be supported by the possible configurations of the programmable execution array 110. If the programmable execution array 110 can be configured to execute the command required by the software application 107, the software application 107 can pause the general purpose central processing unit 104 in order to allow the operation of the command by the programmable execution array 110.

The application manager 108 can reconfigure the programmable execution array 110 if a different command must be implemented for execution of the command call. The application manager 108 can provide a status, through a command execution interface 112, in order to allow the software application 107 to activate a fixed delay or sleep function in the general purpose central processing unit 104. The general purpose central processing unit 104 will resume execution after the delay. The programmable execution array 110 can be reconfigured and execute the command call provided by the software application 107 during the delay of the general purpose central processing unit 104.

While the command execution interface 112 is shown as a direct connection between the general purpose central processing unit 104 and the application manager 108, it is understood that the command execution interface 112 can be implemented as a bus status, serial communication packet, exception indicator, an interrupt, or status exchange sequence. The command execution interface 112 is intended to allow communication between the application manager 108 and the software application 107 executing on the general purpose central processing unit 104. The application manager 108 can access the command execution interface 112 in order to pause or bypass the execution of the command call by the general purpose central processing unit 104. If the application manager 108 is able to execute the command, it can retrieve the command parameters through a memory bus 114. The application manager 108 and the programmable execution array 110 can be paused between the command calls in the flow of the software application 107. It is understood that while the memory bus 114 is shown as two busses, the memory bus 114 can be a single bus having the general purpose central processing unit 104 and the application manager 108 as balanced connections. The programmable execution array 110 can store the results of the execution of the command in the memory device 106 upon completion of a command call from the software application 107.

If the command execution interface 112 is set to indicate the application manager 108 will execute the command, the general purpose central processing unit 104 will skip the command and wait for the application manager 108 to complete the execution of the command call. It is understood that in most cases the application manager 108 can complete the execution of the command before the general purpose central processing unit 104 can detect the command and the application manager 108 can complete a number of the commands before the general purpose central processing unit 104 is ready for its next command.

When the application manager 108 determines that the programmable execution array 110 is not capable of being configured to execute the command required by the software application 107, the application manager 108 can communicate through the command execution interface 112 to the software application 107 which can enable the general purpose central processing unit 104 to execute the command call through software execution. This hardware execution of the commands by the application manager 108 can be adjusted by re-configuring the programmable execution array 110. The execution time of the hardware computing system 100 can be accelerated by providing more commands, that can be accommodated by the application manager 108, than will fit within the programmable execution array 110 in a single configuration. It is understood that additional configurations can be established in the programmable execution array 110 by the application manager 108.

A peripheral control bus 116 provides a communication path to the storage and communication devices coupled to the peripheral controller 102. The application manager 108 can utilize the peripheral controller 102 to complete command operations that require file transfers to or from any attached peripheral devices (not shown).

Figure 2:
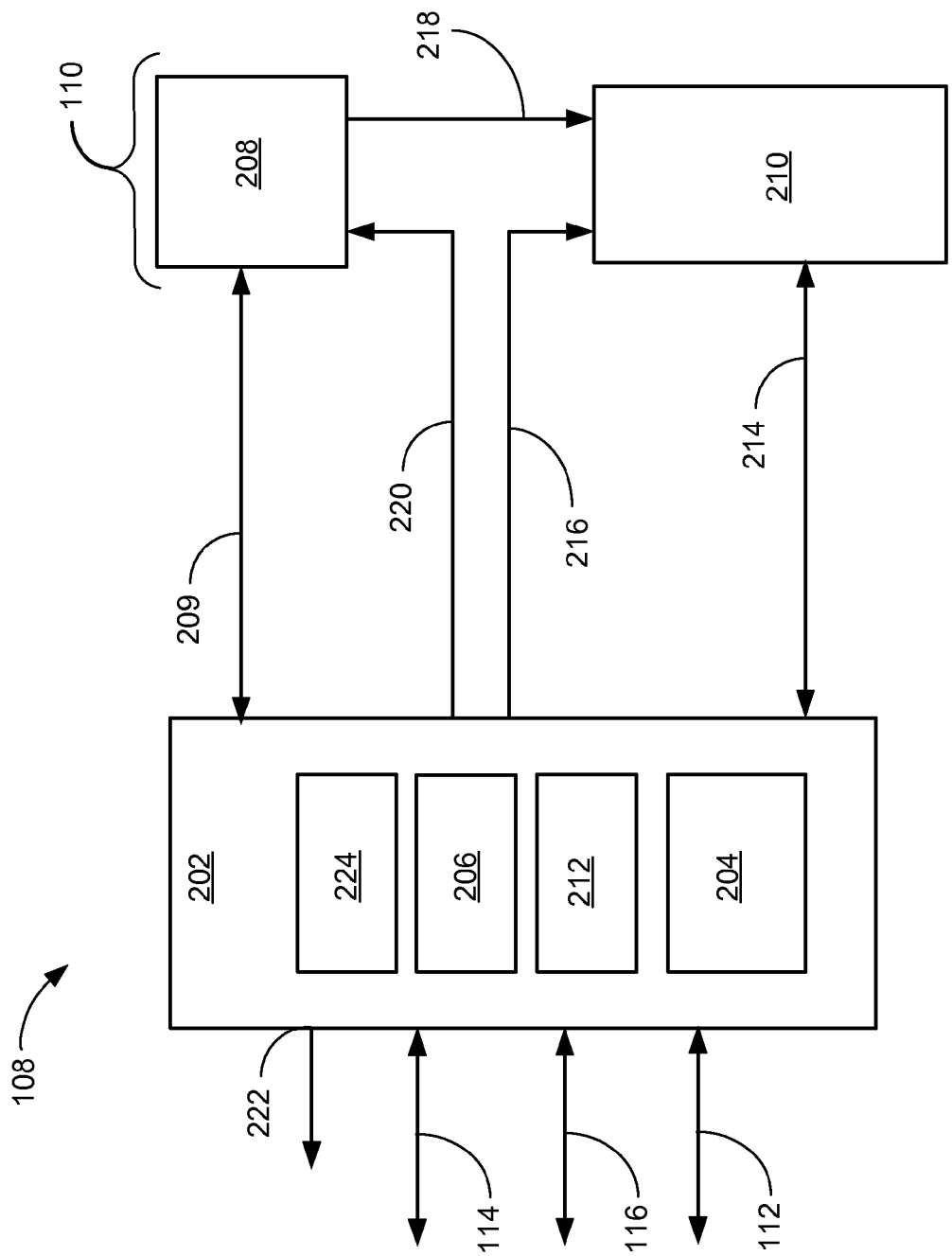
FIG. 2 is a block diagram of the application manager of FIG. 1.

Referring now to FIG. 2, therein is shown a block diagram of the application manager 108 of FIG. 1. The block diagram of the application manager 108 depicts a command processor assembly 202, which can be implemented in a complex programmable logic device (CPLD). The command processor assembly 202 can include a command processor 204 that receives a command stream through an embedded memory controller 206. The command processor 204 can determine if the command can be executed without the assistance of the general purpose central processing unit 104 of FIG. 1.

The command processor 204 can access the embedded memory controller 206, coupled to a configuration memory 208, through an embedded memory bus 209 in order to determine whether the command can be executed by the application manager 108. The configuration memory 208 can be any volatile memory such as a random access memory (RAM) or a non-volatile memory such as a flash memory. The configuration memory 208 can be written by the embedded memory controller 206 to hold the circuit configurations that can be loaded into a configurable logic device 210, such as a field programmable gate array (FPGA).

The command processor 204 can maintain the current configuration of the programmable execution array 110 and if necessary, can alter the configuration by accessing a field programmable gate array (FPGA) interface module 212. The programmable execution array 110 can be coupled to the FPGA interface module 212, which maintains the configuration and percent utilization of the programmable execution array 110. By way of an example, only one of the configuration memory 208 and one of the configurable logic device 210 are shown, but it is understood that the programmable execution array 110 includes more than one each of the configuration memory 208 and the configurable logic device 210.

The command processor 204 can initially determine whether the programmable execution array 110 is currently configured to execute the command that is presented on the memory bus 114 by accessing the configuration memory 208 through the embedded memory controller 206. If it is determined that the programmable execution array 110 is not appropriately configured to execute the command, the command processor 204 can update the current state and configuration of the programmable execution array 110 through the FPGA interface module 212. It is understood that the number of configuration images that are maintained in the configuration memory 208 can represent more logic than is able to be loaded in the configurable logic device 210 at one time. By monitoring the usage statistics of the configuration images, the command processor 204 can manage the loading of the configuration images to the programmable execution array 110 in order to increase the percentage of utilization of the application manager 108.

When the command processor 204 determines that the command can be executed by the configuration within the programmable execution array 110, the command processor 204 can take control of the command by activating a status in the command execution interface 112. The command processor 204 can then retrieve the command parameters and transfer the command parameters through a command traffic bus 214. The command processor 204 activates the FPGA interface module 212 to manage an FPGA control bus 216 during the command parameter transfer and any reconfiguration processes.

In order to reconfigure the programmable execution array 110, the command processor 204 can manipulate the configuration through the FPGA interface module 212 and the embedded memory controller 206. The embedded memory controller 206 can address an instance of the configuration memory 208 in order to provide configuration patterns on a configuration bus 218. The embedded memory controller 206 can drive a memory control bus 220, coupled to the embedded memory 208, to provide address and control lines for selecting the configuration patterns that are provided to the configurable logic device 210. It is understood that the FPGA interface module 212 can be coupled to multiple instances of the configurable logic device 210 within the programmable execution array 110.

The command processor 204 can detect any conditions that can cause erroneous operations, such as the configuration time-out, image loading error, check sum error, or the like. If a failure condition is detected by the command processor 204, the embedded memory controller 206, the FPGA interface module 212, or a combination thereof, the command processor assembly 202 can activate a command process error driver 222. The activation of the command process error driver 222 can cause the general purpose central processing unit 104 to execute the command that was pending during the command set-up by the command processor assembly 202 and detection of the failure condition. The command processor assembly 202 can be coupled to the peripheral control bus 116 for accessing storage and communication devices managed by the peripheral controller 102 of FIG. 1.

A command queue module 224 can manage a series of commands that can be executed by the programmable execution array 110. The command queue module 224 can allow the command processor 204 to hold a command in reserve while the configurable logic device 210 is reconfigured to execute the reserved command. It is understood that command queue module 224 can defer execution of commands for any of the configurable logic device 210 in the programmable execution array 110. It is understood that the communication of a command from the general purpose central processing unit 104 can be interrupted by a higher priority task. The command queue module 224 allows the transfer of the command to be interrupted and later completed without causing additional retry delay.

The command queue module 224 can benefit a multi-threaded operation of the general purpose central processing unit 104 by allowing the programmable execution array 110 to complete the command from the interrupted thread and hold the results until the interrupted thread is restored. The management of the command queue module 224 can provide a watch-dog timer and queue monitoring that prevents the retrieval of the incorrect information by the general purpose central processing unit 104 while switching operational threads as performed by the multi-threaded operation or the general purpose central processing unit 104 having multiple operational cores.

It has been discovered that the configuration memory 208 can be programmed with configuration images for the configurable logic device 210 that can be targeted to support a specific set of the software application 107 of FIG. 1 or to support specific sets of commands that are inefficient when executed by the general purpose central processing unit 104. The performance of the hardware computing system 100 of FIG. 1 can be measured to be greater than twice that of the general purpose central processing unit 104 alone. It is understood that the logical connections within the command processor assembly 202 are not shown for clarity and brevity.

Figure 3:
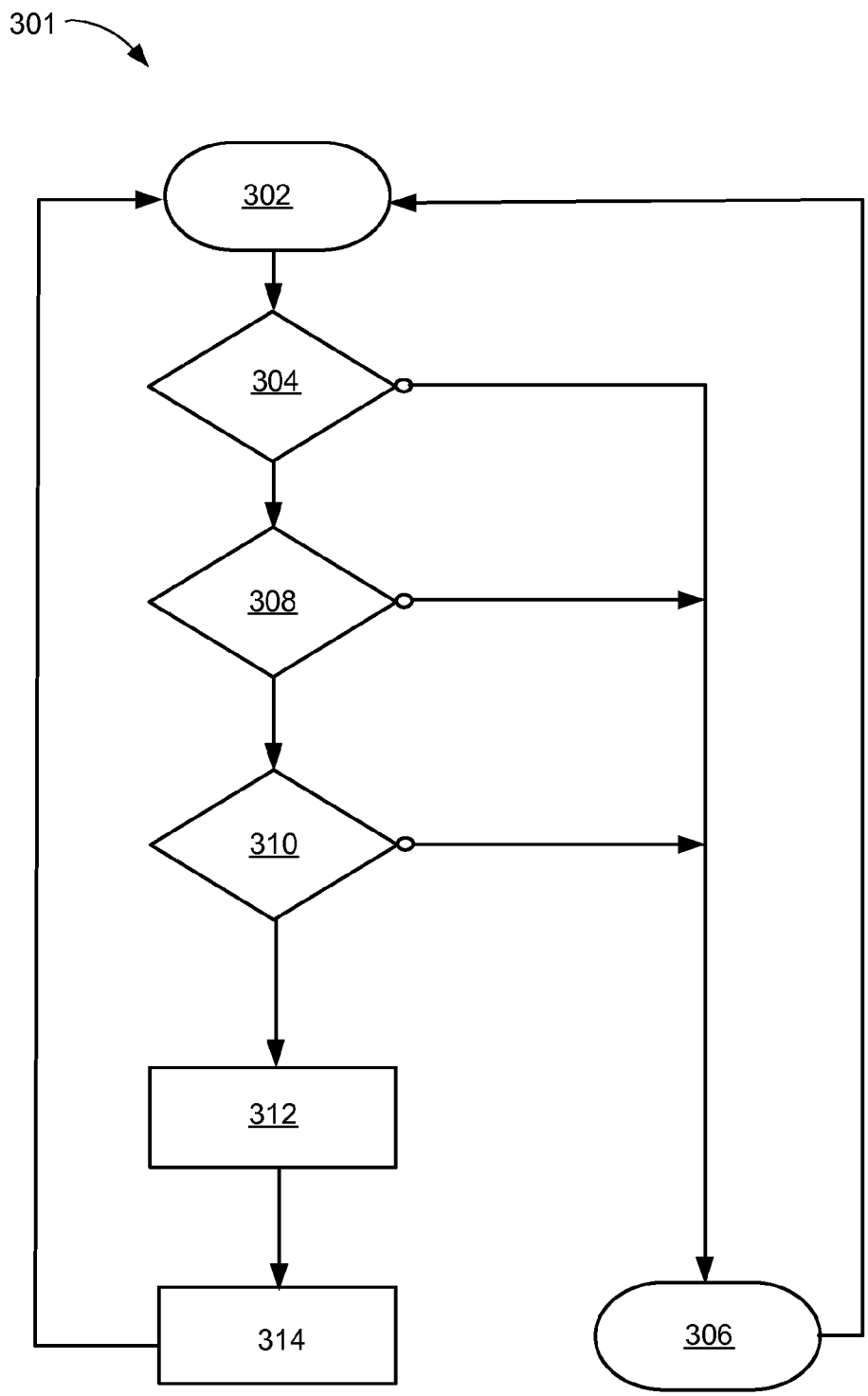
FIG. 3 is a flow chart of the operation of the application manager of FIG. 1.

Referring now to FIG. 3, therein is shown a flow chart 301 of the operation of the application manager 108 of FIG. 1. The flow chart 301 of the operation of the application manager 108 includes a receive command module 302, in which the command processor 204 of FIG. 2 can store a session number as required by the embedded memory controller 206 of FIG. 2, which determines the logic requirement for the programmable execution array 110 of FIG. 1 in order to support the current session, and initializes session statistics of which of the available logic images is used in the programmable execution array 110. The receive command module 302 can include capturing a command by monitoring the command bus of the general purpose central processing unit, receiving an application call through a register set or shared memory, storing a command in the command queuing module 224 of FIG. 2, or receiving a command packet transfer through the application manager 108 of FIG. 1. The flow chart 301 then proceeds to a verify FPGA image module 304.

The verify FPGA image module 304 can determine whether the current image loaded in the programmable execution array 110 will support the command execution that corresponds to the session number stored by the command processor 204. It is understood that the verify FPGA image module 304 can detect a configuration time-out, image loading error, check sum error, or the like in order to determine that the currently loaded image in the programmable execution array 110 may not support the requirement of the current session. If the verify FPGA image module 304 determines the currently loaded image in the programmable execution array 110 will not support the requirement of the current session, the flow proceeds to a software execution module 306.

The software execution module 306 can update the session number of the programmable execution array 110 logic image, the programmable execution array 110 is loaded with a logic image based on the command, and the command processor 204 releases the command execution interface 112 of FIG. 1 and allows the general purpose central processing unit 104 of FIG. 1 to execute software to complete the command execution. The usage statistics, used to determine which of the logic image will be loaded in the programmable execution array 110, can be analyzed by a number of algorithms including but not limited to a least most recently used (LMRU), least frequently used (LFU), next most recently used (NMRU), or the like. It is understood that the decision to execute the command by the application manager 108 of FIG. 1 or by the general purpose central processing unit 104 can occur before any delay in the command execution is incurred. Upon the initiation of execution of the current command, the flow returns to the receive command module 302 in order to process the next command.

If the verify FPGA image module 304 determines the currently loaded image in the programmable execution array 110 will support the requirement of the current session, the flow proceeds to a verify required image module 308. The verify required image module 308 can determine whether the application manager 108 has the required configuration to support the command. This is performed by reading the current configuration from the configuration memory 208 of FIG. 2. If the verify required image module 308 determines that the required configuration to support the command is not loaded in the programmable execution array 110, but is in the configuration memory 208, the configurable logic device 210 of FIG. 2 of the programmable execution array 110 can be updated to include the required function. During the reconfiguration of the configurable logic device 210, the command parameters can be maintained in the command queuing module 224.

In the case that the programmable execution array 110 must be reconfigured, the command execution interface 112 can cause the general purpose central processing unit 104 to enter a sleep state in order to allow the reconfiguration to occur. During the update process the detection of the configuration time-out, image loading error, check sum error, or the like, can cause the flow to proceed to the software execution module 306 which allows the command execution by software performed by the general purpose central processing unit 104.

If on the other hand the verify required image module 308 determines the application manager 108 has the required configuration loaded to support the command, the flow proceeds to a check for FPGA available module 310. The check for busy module 310 can determine whether the programmable execution array 110 is busy by the command processor 204 interrogating the FPGA interface module 210 of FIG. 2. The FPGA interface module 210 can provide an indication of command execution within the programmable execution array 110. If the check for FPGA available module 310 determines that the programmable execution array 110 is busy, the flow proceeds to the software execution module 306 and allows the command execution by software executed by the general purpose central processing unit 104.

If the check for FPGA available module 310 determines that the programmable execution array 110 is not busy, the flow proceeds to an execute command module 312. In the execute command module 312, the command processor 204 can retrieve the input data from the memory bus 114 of FIG. 1. The input data is provided to the FPGA interface module 210 for transfer to the appropriate input registers of the programmable execution array 110. Upon completion of the command execution by the programmable execution array 110, the command processor 204 can respond through the command execution interface 112 of FIG. 1 in order to step to the next command in the software application 107 of FIG. 1. The flow then proceeds to an update statistics module 314.

The update statistics module 314 can transfer completion status indicating the resolution of the command executed by the programmable execution array 110. The command processor 204 can increment the program counter in order to retrieve the next command and the flow then returns to the receive command module 302 in order to process the next command.

It has been discovered that the usage statistics as generated by the command processor 204 can improve the frequency of configuration matches between the command sequence and the configuration of the programmable execution array 110. As the application manager 108 can increase its execution percentage, the performance of the hardware computing system 100 of FIG. 1 can be increased between 10 and 100 times the performance of the general purpose central processing unit 104 on its own.

Figure 4:
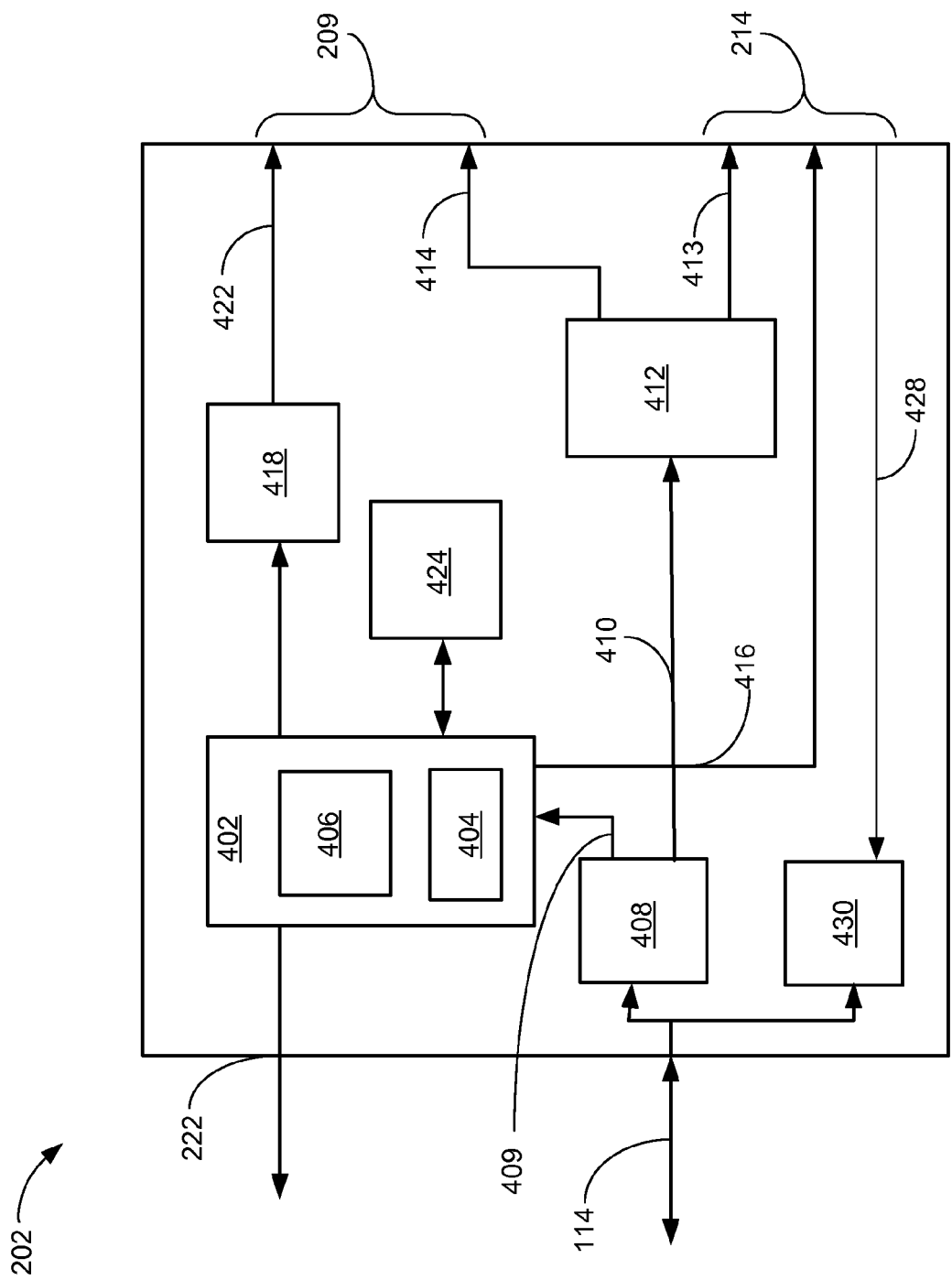
FIG. 4 is a detailed block diagram of the command processor assembly of FIG. 2.

Referring now to FIG. 4, therein is shown a detailed block diagram of the command processor assembly 202 of FIG. 2. The detailed block diagram of the command processor assembly 202 depicts a command interpreter 402 having an FPGA control module 404 and a command processing unit 406. A service request module 408, such as a command request queue mechanism can be coupled to the memory bus 114. The service request module 408 can maintain the session number associated with the command and pass the command to the command interpreter 402.

The service request module 408 can maintain a queue for each of the possible commands that are supported by the programmable execution array 110. The general purpose central processing unit 104 of FIG. 1 can read the status of the queues within the service request module 408 in order to enable command chaining and pipelining of consecutive command strings. The service request module 408 can be coupled to the command interpreter 402 by a session identification bus 409. The session identification bus 409 allows the command interpreter 402 to monitor the operation of commands that can be queued in the service request module 402. The service request module 408 can provide a command stream 410 to a selector 412. The selector 412 can direct the command stream 410 through an FPGA data stream 413 and a memory data stream 414.

The FPGA data stream 413 can provide configuration image data as well as the command input data required to execute a configured command. An FPGA program control bus 416 can be sourced from the command interpreter 402 and can be managed by the FPGA control manager 404.

The memory data stream 414 can provide FPGA configuration data options to be stored in the configuration memory 208 of FIG. 2. The memory data stream 414 can also be used to retrieve the FPGA configuration data used to re-configure the configurable logic device 210 of FIG. 2.

A memory control function 418 can be coupled to the command interpreter 402 for managing the embedded memory bus 209. The memory control function 418 can source the memory control bus 422, which in coordination with the memory data stream 414 forms the embedded memory bus 209. An embedded table memory 424 can be coupled to the command interpreter 402 for maintaining current configuration data and statistical usage data.

The command traffic bus 214 includes the FPGA data stream 413, the FPGA program control bus 416, and an FPGA response bus 428. The coordination of the FPGA data stream 413 and the FPGA program control bus 416 is under control of the FPGA control module 404. The command interpreter 402 can monitor the integrity of the transfers between the command data stream 408 and the command traffic bus 214 or the embedded memory bus 209. If the command interpreter 402 detects an error in the transfers the command process error driver 222 will be asserted.

The FPGA response bus 428 can be coupled to a service response module 430. The service response module 430 can maintain a response queue for each of the possible commands that are supported by the programmable execution array 110. The service response module 430 can store the session number status for each of the operations completed by the programmable execution array 110. The output of the service response module 430 can be coupled to the memory bus 114 in order to convey pending status and results to the general purpose central processing unit 104 of FIG. 1.

It is understood that the implementation details provided are a possible implementation of the present invention. It is further understood that other implementations may be possible and are included by the description in this specification.

It has been discovered that the combination of the service request module 408, the programmable execution array 110, and the service response module 430 can allow the software application 107 of FIG. 1 to execute multiple consecutive commands, multiple commands from different threads, or iterative commands while reducing the burden on the general purpose central processing unit 104. The reduction in processing requirements on the general purpose central processing unit 104 can increase the system performance by greater than a factor of 2.

Figure 5:
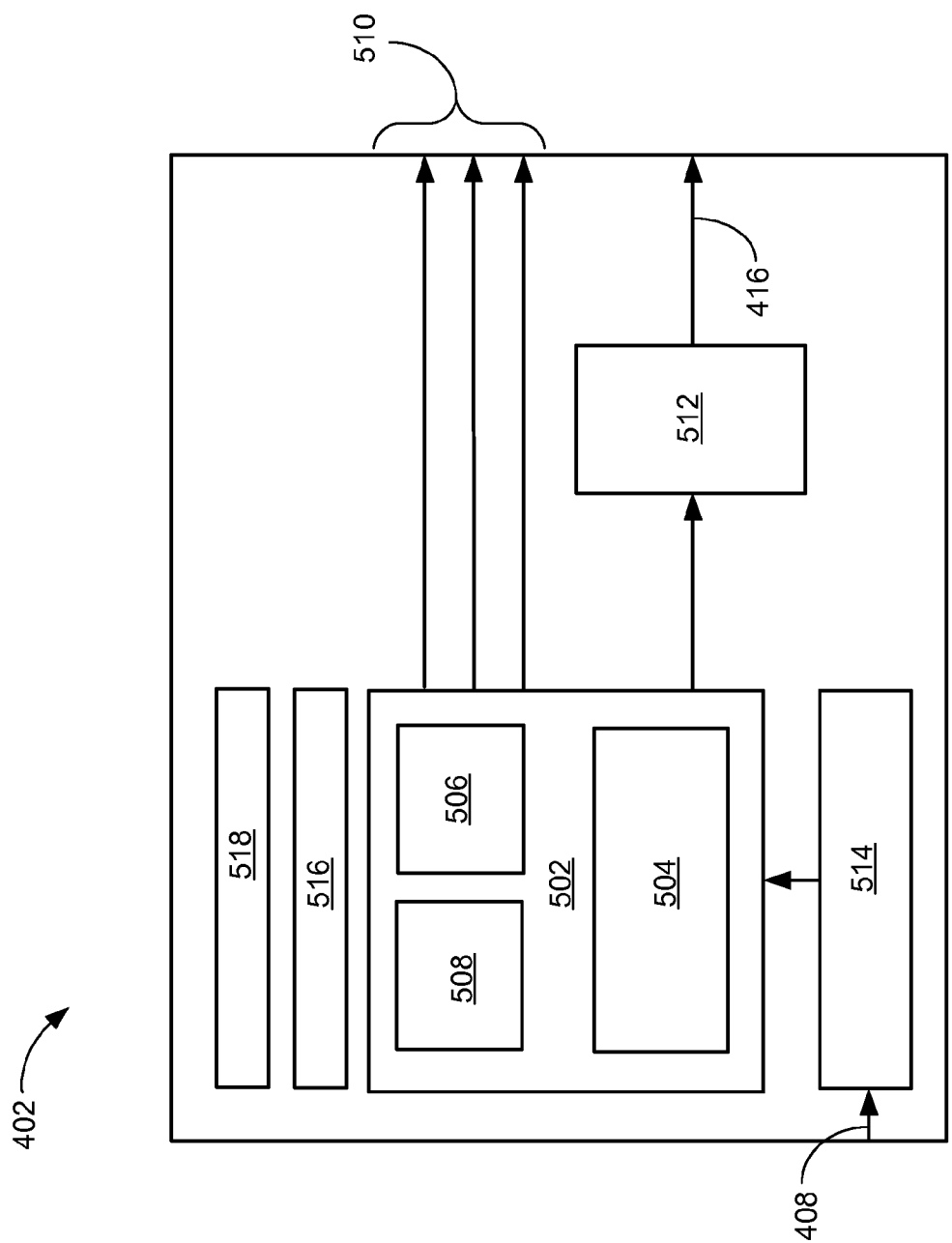
FIG. 5 is a detailed block diagram of the command interpreter of FIG. 4.

Referring now to FIG. 5, therein is shown a detailed block diagram of the command interpreter 402 of FIG. 4. The detailed block diagram of the command interpreter 402 depicts a command control module 502 having an FPGA interface controller 504. The FPGA interface controller 504 can include state machines and check logic that provides full integrity during the loading of characterization images and the command input and results.

The command control module 502 also has a table memory controller 506 and an application command decoder logic 508. The table memory controller 506 can source a memory interface bus 510 that provides enable, address, and read/write control to the memory control function 418 of FIG. 4.

An FPGA parallel loader 512 is managed by the FPGA interface controller 504. The FPGA parallel loader 512 can provide the FPGA program control bus 416 while also performing error checking and timing control.

The application command decoder logic 508 can receive the output of a framer 514 that processes the command stream 408. The command control module 502 can verify the rate and alignment of the framer 514 during processing. An FPGA utilization vector 516 can maintain the utilization vector and percent utilization of the programmable execution array 110 of FIG. 2 as an aid during reconfiguration of the configurable logic device 210 of FIG. 2.

A per partition usage register 518 can monitor the usage statistics of all of the commands partitioned in the programmable execution array 110 of FIG. 1. The usage statistics maintained in the per partition usage register 518 can provide session number statistics to track command execution within the programmable execution array 110. The usage statistics can guide the reconfiguration of the configurable logic device 210 by matching the session number of an executable thread for the general purpose central processing unit 104 of FIG. 1.

Figure 6:
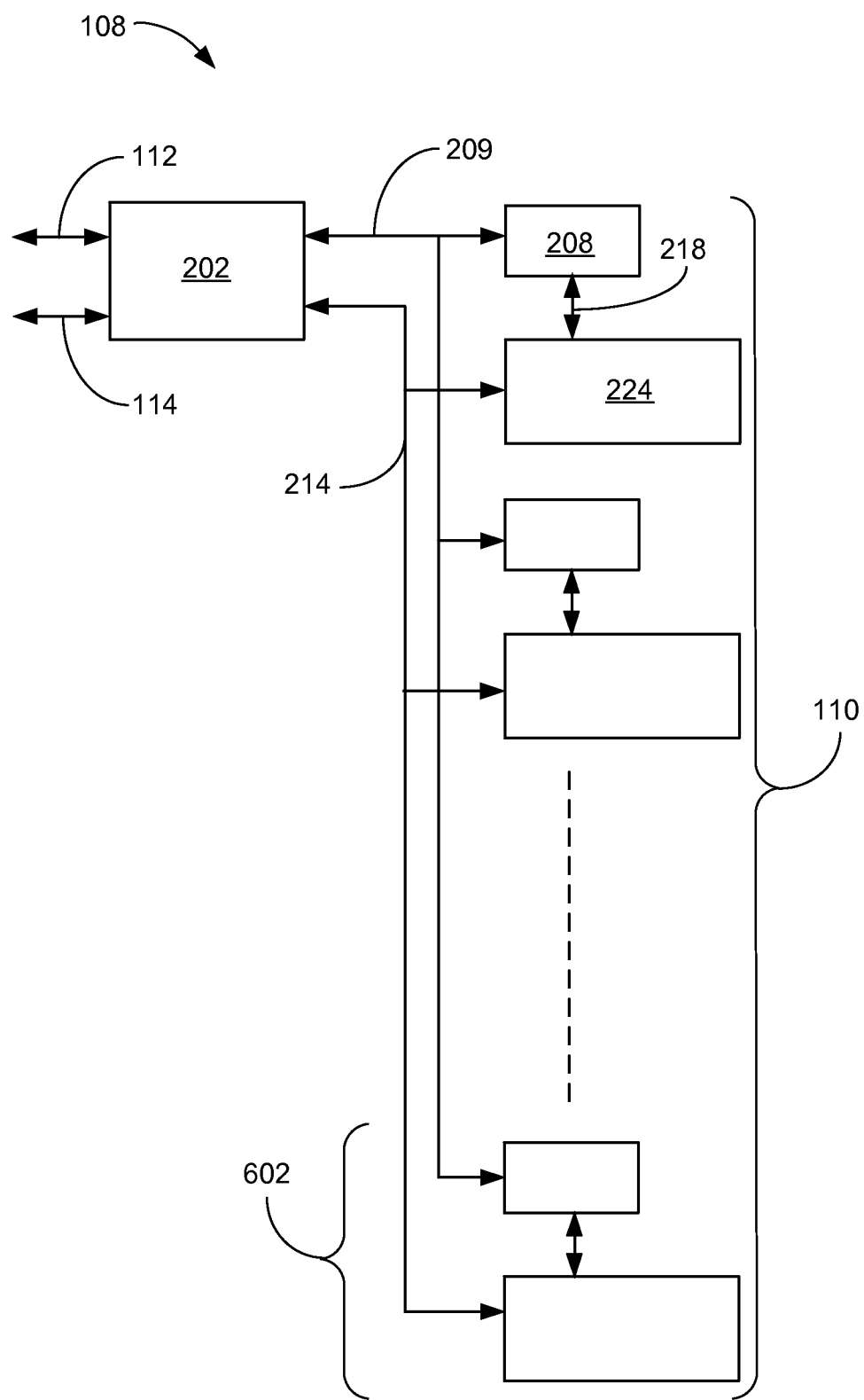
FIG. 6 is a detailed block diagram of the application manager of FIG. 1.

Referring now to FIG. 6, therein is shown a detailed block diagram of the application manager 108 of FIG. 1. The detailed block diagram of the application manager 108 depicts the command processor assembly 202 having the command execution interface 112 and the memory bus 114 forming a system interface side of the command processor assembly 202.

An execution side of the command processor assembly 202 can include the embedded memory bus 209 and the command traffic bus 214. The embedded memory bus 209 can couple to each instance of the configuration memory 208 in the programmable execution array 110. There is one instance of the configuration memory 208 coupled to one instance of the configurable logic device 224 by the configuration bus 218 included in an execution cell 602. The execution cell 602 also includes one instance of the configurable logic device 224 which is coupled to the command traffic bus 214. More than one of the execution cell 602 can be included in the programmable execution array 110.

It is understood that an increased number of the execution cell 602 can require additional instances of the embedded memory bus 209 and the command traffic bus 214. It is further understood that the implementation of the additional instances of the embedded memory bus 209 and the command traffic bus 214 can allow concurrent execution of commands in the separate instances of the execution cell 602. Some command execution can require configuring multiple instances of the execution cell 602 to execute a single command, such as a double precision mathematical operation.

It has been discovered that the configuration of the programmable execution array 110 can provide support for concurrent execution, by the execution cell 602, of multiple queued commands from the software application 107 of FIG. 1. It has further been discovered that by carrying a session number as a label through the entire operation, the commands and results can be queued in the service request module 408 and the service response module 430 without losing the context of the results. The burden, on the general purpose central processing unit 104 of FIG. 1, can be reduced because of a reduction in execution requirements and interrupt processing associated with the software application 107.

Figure 7:
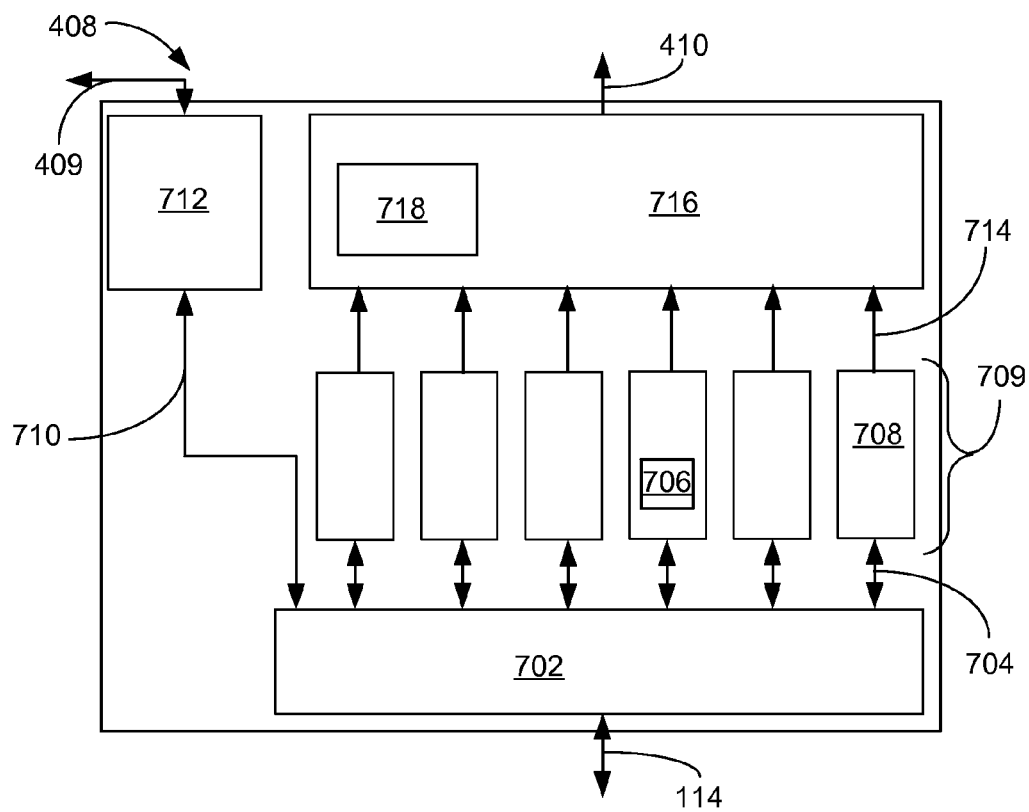
FIG. 7 is a detailed block diagram of the service request module of FIG. 4.

Referring now to FIG. 7, therein is shown a detailed block diagram of the service request module 408 of FIG. 4. The detailed block diagram of the service request module 408 depicts an ingress control module 702 coupled to the memory bus 114. The ingress control module 702 can support bidirectional communication to allow command delivery and polling by the software application 107 of FIG. 1.

The ingress control module 702 can drive several instances of a command queue bus 704 for transferring a command 706 to a queuing register 708. The queuing register 708 can be implemented as a volatile memory, non-volatile memory, or register file to store the command 706 for deferred operation, interrupted transfer, or diagnostic operations. It is understood that the command 706 can include all of the input parameters necessary to execute the command 706 within an instance of the execution cell 602 of FIG. 6. A command queuing array 709 is formed by a number of the queuing register coupled to the ingress control module 702.

A controller bus 710 can couple the ingress control module 702 to a command interpreter interface 712, such as a framer for synchronizing the communication between the ingress control module 702 and the command interpreter 402 of FIG. 4. The command interpreter interface 712 can provide the session identification bus 409 to the command interpreter 402. The command interpreter interface 712 can provide the session number information to the command interpreter 402 for monitoring the status and availability of the execution cell 602 required to execute the command 706.

The queuing register 708 can provide an FPGA instruction bus 714 that is coupled to a command stateful multiplexer 716. The command stateful multiplexer 716 can have a state tracking module 718 that monitors the session numbers of the command 706 associated with each of the queuing register 708. The ingress control module 702 can determine when all of the parameters, for the command 706, are assembled within the queuing register 708. The queuing register 708 is capable of supporting multiple of the command 706 or parts of the command 706. The state tracking module 718 can allow the command stateful multiplexer 716 to manage a multi-threaded operation of the application software 107 of FIG. 1 as well as queuing of the command 706 for deferred processing.

The command stateful multiplexer 716 can be controlled by the combination of the state tracking module 718 and the FPGA instruction bus 714. When the ingress control module 702 determines that the command 706 is ready for execution, a signal is sent to the command stateful multiplexer 716 that causes the session identification and the command 706 to be sent through the command stream 410 to the execution cell 602 that is slated to execute the command 706.

The ingress control module 702 can establish a timeout for any partially loaded instance of the command 706. If for any reason the command 706 is not fully loaded in the queuing register 708, an error can be detected and the command interpreter 402 can be alerted. The command interpreter 402 can assemble an error response that can be communicated to the general purpose central processing unit 104 of FIG. 1 through the command process error driver 222.

It is understood that the service request module 408 has been shown having six of the queuing register 708 as an example of the implementation without limiting the number of the queuing register 708. It is further understood that the software application 107 can communicate with the service request module 408 by polling or by establishing an interrupt through the command interpreter 402.

It has been discovered that the management of the queuing registers 708 can provide a rapid execution path for the command 706 from the software application 107. Since each of the queuing registers 708 can monitor multiple instances of the command 706 it is possible to link successive operations and perform whole sub-routines without interrupting the progress of the general purpose central processing unit 104. The accelerated execution of the software application 107 can dramatically increase the performance of the general purpose central processing unit 104.

Figure 8:
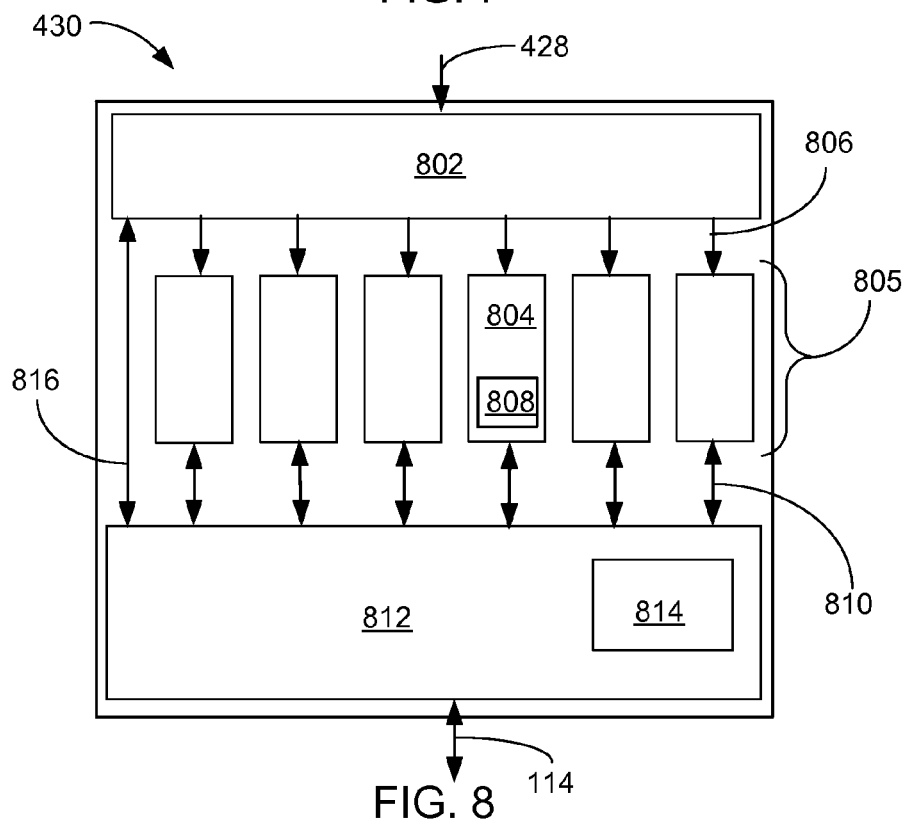
FIG. 8 is a detailed block diagram of the service response module of FIG. 4.

Referring now to FIG. 8, therein is shown a detailed block diagram of the service response module 430 of FIG. 4. The detailed block diagram of the service response module 430 depicts the FPGA response bus 428 coupled to an FPGA bus interface 802. The FPGA bus interface 802 can direct the FPGA response bus 428 to a response queuing register 804 in a response queuing array 805 through a session selected bus 806. The response queuing array 805 can match the operation of the command queuing array 709 of FIG. 7 in order to align the correct instance of a response 808 on the memory bus 114.

The response 808 can include status and data associated with the execution of the command 706 of FIG. 7 by the execution cell 602 of FIG. 6. The response 808 can be provided through a result and status bus 810 to a result stateful multiplexer 812. The result stateful multiplexer 812 can include a response session tracking module 814 for determining which of the response queuing register 804 in the response queuing array 805 can contain the response 808 for a specific session identification.

A response steering bus 816 can couple the FPGA bus interface 802 to the result stateful multiplexer 812. The result stateful multiplexer 812 can convey the response 808 from the response queuing register 804 to the memory bus 114. The result stateful multiplexer 812 can provide conditional interrupts to the general purpose central processing unit 104 to notify of completion of the command 706, an error status, or exception condition.

It is understood that the service response module 430 has been shown having six of the response queuing register 804 as an example of the implementation without limiting the number of the response queuing register 804. It is further understood that the software application 107 can communicate with the service response module 430 by polling or by establishing an interrupt through the memory bus 114.

It has been discovered that the management of the response queuing register 804 can provide a rapid execution path for the response 808 to the command 706 from the software application 107 including providing the response 808 correctly aligned with a queued instance of the command 706. Since each of the response queuing register 804 can monitor multiple instances of the response 808 it is possible to link successive operations and perform whole sub-routines without interrupting the progress of the general purpose central processing unit 104. The accelerated execution of the software application 107 can dramatically increase the performance of the general purpose central processing unit 104.

Figure 9:
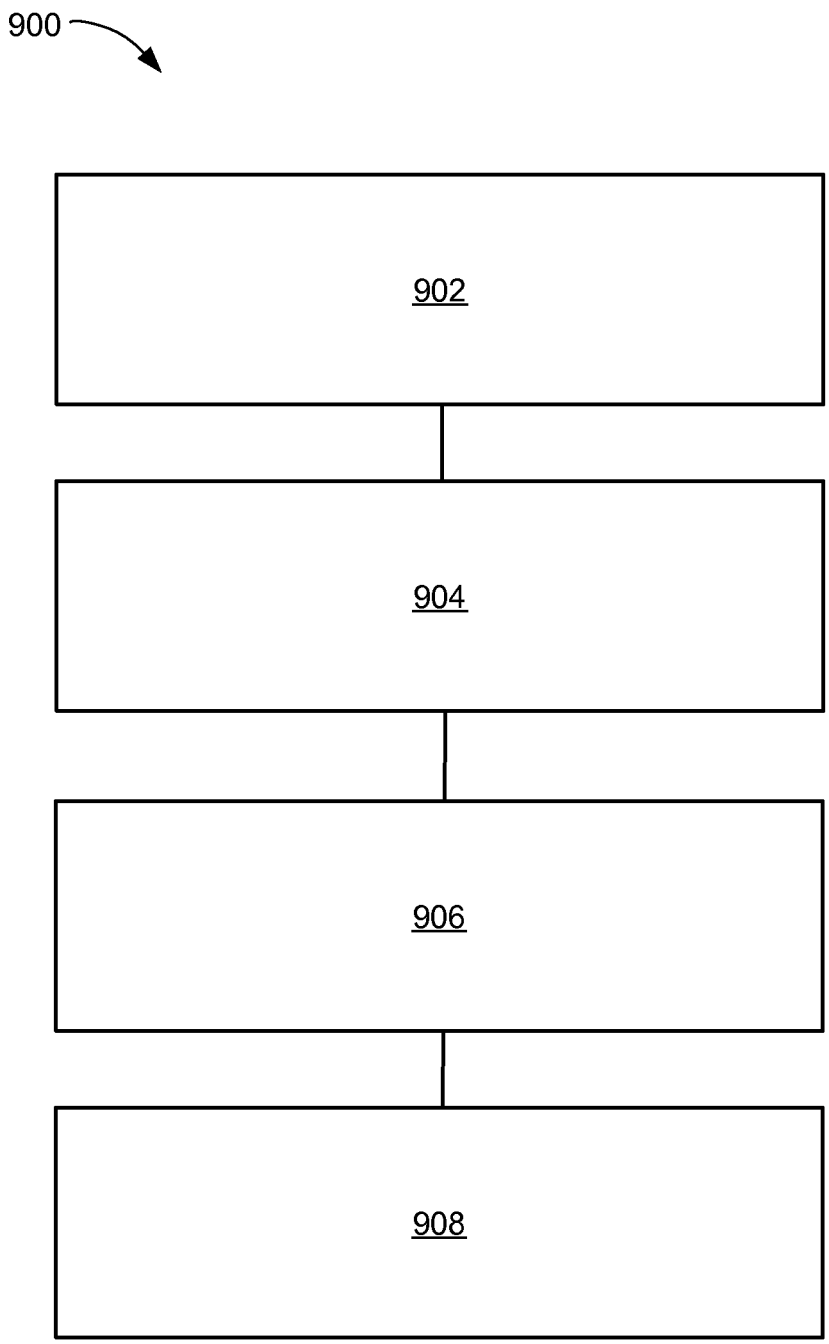
FIG. 9 is a flow chart of a method of operation of a hardware computing system in a further embodiment of the present invention.

Referring now to FIG. 9, therein is shown a flow chart of a method 900 of operation of a hardware computing system in a further embodiment of the present invention. The method 900 includes: receiving a command stream from a general purpose central processing unit in a block 902; transferring a command from the command stream by an application manager in a block 904; activating a programmable execution array, by the application manager, for processing the command in a block 906; and providing a response through a result stateful multiplexer to the general purpose central processing unit for the command from the command stream in a block 908.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a hardware computing system comprising:
  receiving a command stream from a general purpose central processing unit;
  transferring a command from the command stream by an application manager;
  activating a programmable execution array, by the application manager, for processing the command includes:
    monitoring a memory bus for receiving the command,
    verifying, by a command processor, a configuration of the programmable execution array,
    identifying an execution cell within the programmable execution array for executing the command, and
    transferring, by a field programmable gate array (FPGA) interface module, input parameters for the command to the execution cell; and
  providing a response through a result stateful multiplexer to the general purpose central processing unit for the command from the command stream.

2. The method as claimed in claim 1 wherein transferring the command from the command stream by the application manager includes:
  monitoring, by a framer, the command in the command stream;
  activating a command control module having a field programmable gate array (FPGA) interface controller;
  interrogating a per partition usage register for determining usage statistics of the programmable execution array; and
  loading an FPGA parallel loader, with the command, by the FPGA interface controller for executing the command.

3. The method as claimed in claim 1 wherein processing the command by the programmable execution array includes:
  verifying, by a command interpreter, the configuration of the programmable execution array; and
  updating a per partition usage register for maintaining usage statistics of the programmable execution array.

4. The method as claimed in claim 1 further comprising accessing a memory device by the general purpose central processing unit and the application manager for generating the command stream.

5. A method of operation of a hardware computing system comprising:
  receiving a command stream from a general purpose central processing unit includes accessing a memory device;
  transferring a command from the command stream by an application manager including determining by a command processor whether the command can be executed by the application manager;
  activating a programmable execution array, by the application manager, for processing the command including selecting an execution cell for executing the command; and
  providing a response through a result stateful multiplexer to the general purpose central processing unit for the command from the command stream including transferring, through a response queuing array, the response to the memory device.

6. The method as claimed in claim 5 wherein transferring the command from the command stream by the application manager includes:
  monitoring, by a framer, the command in the command stream;
  activating a command control module having a field programmable gate array (FPGA) interface controller;
  interrogating a per partition usage register for determining usage statistics of the programmable execution array including determining the execution cell configured to execute the command; and
  loading an FPGA parallel loader, with the command, by the FPGA interface controller for transferring the command to the execution cell.

7. The method as claimed in claim 5 wherein processing the command by the programmable execution array includes:
  monitoring a memory bus for receiving the command of the software application;
  verifying, by a command processor, a configuration of the programmable execution array;
  identifying an execution cell within the programmable execution array for executing the command; and
  transferring, by a field programmable gate array (FPGA) interface module, input parameters for the command from the memory bus to the execution cell within the programmable execution array.

8. The method as claimed in claim 5 wherein executing the command by the programmable execution array includes:
   verifying, by a command interpreter, a configuration of the programmable execution array including identifying the execution cell supporting the command;
   transferring the command through a service request module including queuing, in a queuing register, the command; and
   updating a per partition usage register for maintaining usage statistics of the programmable execution array.

9. The method as claimed in claim 5 wherein activating the programmable execution array for processing the command includes:
   queuing, in a queuing register, the command;
   transferring, by a command stateful multiplexer, the command to the execution cell; and
   queuing a response, for the command, from the programmable execution array to the memory device.

10. A hardware computing system comprising:
    a general purpose central processing unit for transferring a command stream;
    an application manager coupled to the general purpose central processing unit for receiving a command from the command stream;
    a programmable execution array, coupled to the application manager, for processing the command includes:
       a command processor assembly, in the application manager, coupled to each instance of a configuration memory by an embedded memory bus, and
       a configurable logic device coupled to the configuration memory by a configuration bus; and
    a result stateful multiplexer coupled between the general purpose central processing unit and the programmable execution array includes the command executed by the programmable execution array and a response transferred to the general purpose central processing unit.

11. The system as claimed in claim 10 wherein the programmable execution array coupled to the application manager for processing the command includes:
    a framer configured to load the command from the command stream;
    a command control module, having a field programmable gate array (FPGA) interface controller, coupled to the framer; and
    an FPGA parallel loader coupled to the field programmable gate array (FPGA) interface controller for loading the command in the programmable execution array.

12. The system as claimed in claim 10 wherein the programmable execution array coupled to the application manager includes:
    a command interpreter, in the application manager, verified a configuration of the programmable execution array;
    an execution cell, in the programmable execution array, coupled to the command interpreter; and
    an embedded table memory coupled to the command interpreter for maintaining usage statistics of the execution cell.

13. The system as claimed in claim 10 wherein the result stateful multiplexer coupled between the general purpose central processing unit and the programmable execution array includes a response queuing register coupled to the result stateful multiplexer for ordering the response to a queue of the command.

14. The system as claimed in claim 10 further comprising:
    a command queuing array in the application manager for loading the command;
    a response queuing array in the application manager for storing the response to the command; and
    a response session tracking module, coupled to the result stateful multiplexer, controlled the response queuing array for matching the response to the correct instance of the command.

15. The system as claimed in claim 14 wherein the programmable execution array coupled to the application manager for executing the command includes:
    a framer configured to load the command from the command stream;
    a command control module, having a field programmable gate array (FPGA) interface controller, coupled to the framer; and
    an FPGA parallel loader coupled to the field programmable gate array (FPGA) interface controller for loading the command into a command queuing register of the command queuing array.

16. The system as claimed in claim 14 wherein the programmable execution array coupled to the application manager includes
    a command traffic bus coupled between the configurable logic device and the command queuing array.

17. The system as claimed in claim 14 wherein the programmable execution array coupled to the application manager includes:
    a command interpreter, in the application manager, verified a configuration of the programmable execution array;
    an execution cell, in the programmable execution array, coupled to the command interpreter;
    an embedded table memory coupled to the command interpreter for maintaining usage statistics of the execution cell; and
    a service request module, coupled to the command interpreter, having a state tracking module for loading the command in the command queuing array.

18. The system as claimed in claim 14 wherein result stateful multiplexer coupled between the general purpose central processing unit and the programmable execution array includes a response queuing register coupled to the result stateful multiplexer for ordering the response to a queue of the command based on the control from a response session tracking module.

* * * * *